United States Patent
Hurley et al.

(10) Patent No.: US 6,584,257 B1
(45) Date of Patent: Jun. 24, 2003

(54) FIBER OPTIC ASSEMBLY AND METHOD OF MAKING SAME

(75) Inventors: William C. Hurley, Hickory, NC (US); Samuel D. Navé, Conover, NC (US); Shail Moorjani, Conover, NC (US); Martyn Easton, Hickory, NC (US)

(73) Assignee: Corning Cable Systems, LLC, Hickory, NC (US)

( * ) Notice: Subject to any disclaimer, the term of this patent is extended or adjusted under 35 U.S.C. 154(b) by 141 days.

(21) Appl. No.: 09/749,001

(22) Filed: Dec. 27, 2000

(51) Int. Cl.[7] .................................. G02B 6/44
(52) U.S. Cl. ........................................ 385/109
(58) Field of Search ............................. 385/109–114

(56) References Cited

U.S. PATENT DOCUMENTS

| | | | | |
|---|---|---|---|---|
| 4,147,407 A | * | 4/1979 | Eichenbaum et al. .... | 350/96.34 |
| 4,666,244 A | * | 5/1987 | Van der Velde et al. . | 350/96.23 |
| 4,752,112 A | | 6/1988 | Mayr ...................... | 350/96.23 |
| 4,900,126 A | | 2/1990 | Jackson et al. ........... | 350/46.23 |
| 4,952,020 A | * | 8/1990 | Huber ...................... | 350/96.23 |
| 5,286,924 A | | 2/1994 | Loder et al. ............. | 174/117 F |
| 5,442,722 A | * | 8/1995 | DeCarlo ...................... | 385/114 |
| 5,966,489 A | | 10/1999 | Harwell et al. ............. | 385/114 |
| 6,134,360 A | | 10/2000 | Cheng et al. .................. | 385/39 |
| 6,319,603 B1 | * | 11/2001 | Komiya et al. | |

FOREIGN PATENT DOCUMENTS

| | | | | |
|---|---|---|---|---|
| DE | 3606626 A1 | 9/1987 | ............ | G02B/6/44 |
| JP | 1-138519 A | 5/1989 | ............ | G02B/6/44 |
| JP | 2-56510 A | 2/1990 | ............ | G02B/6/44 |

* cited by examiner

*Primary Examiner*—Akm E. Ullah
*Assistant Examiner*—Jerry T. Rahll
(74) *Attorney, Agent, or Firm*—Timothy J. Aberle

(57) ABSTRACT

Optical fibers are lightly tacked together in parallel relation to prevent relative sliding between the fibers along their lengthwise directions, by forming a longitudinally extending frangible web bonded between the fibers. The web in one embodiment is formed by applying a coating of a hardenable composition in a fluid state to the adjacent fibers and then removing the composition from the fibers except on the opposing surfaces of the adjacent fibers, and causing or allowing the composition remaining between the fibers to harden. Alternatively, a coloring compound is coated onto each fiber and the fibers are pressed and held together until the compound solidifies. In yet another embodiment a solid coating of material soluble in a volatile solvent is provided on each fiber, and the coatings are contacted by solvent to render them tacky, the fibers then being pressed and held together until the coatings resolidify.

33 Claims, 2 Drawing Sheets

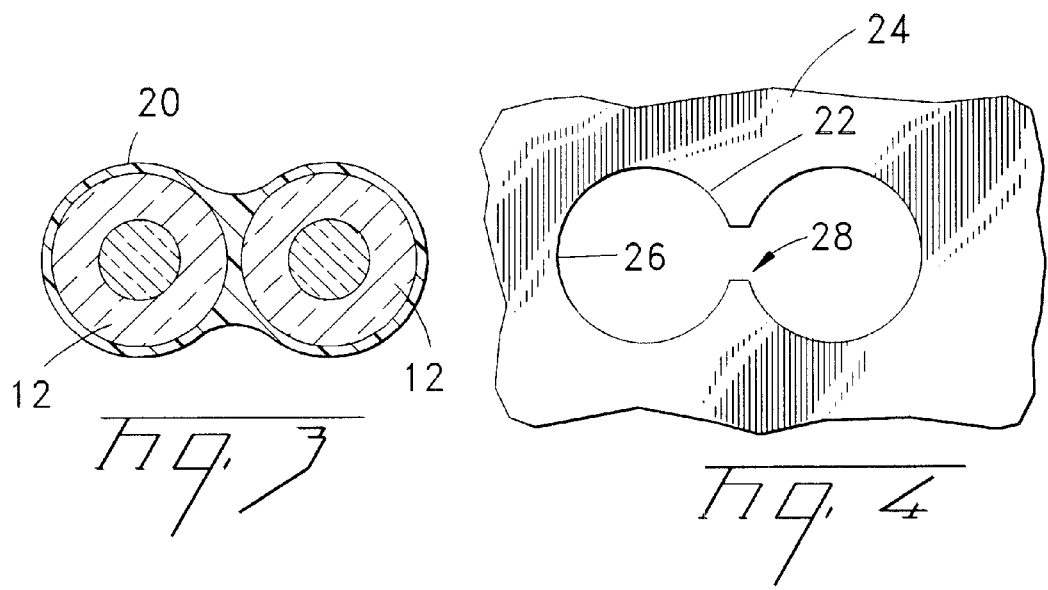
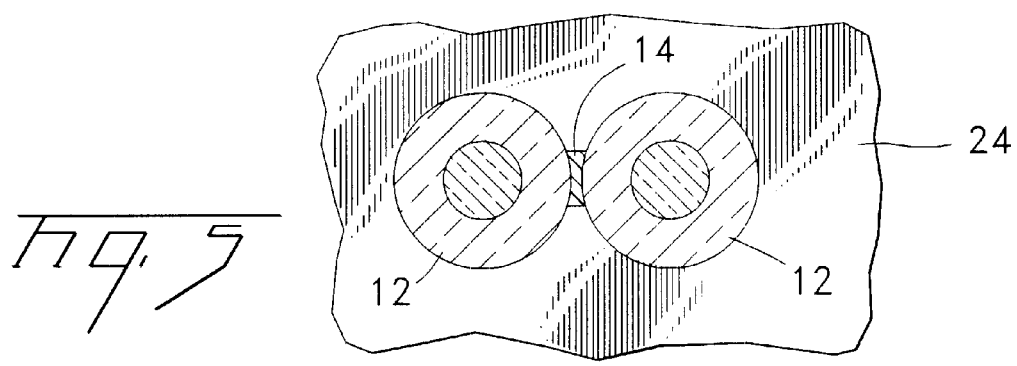
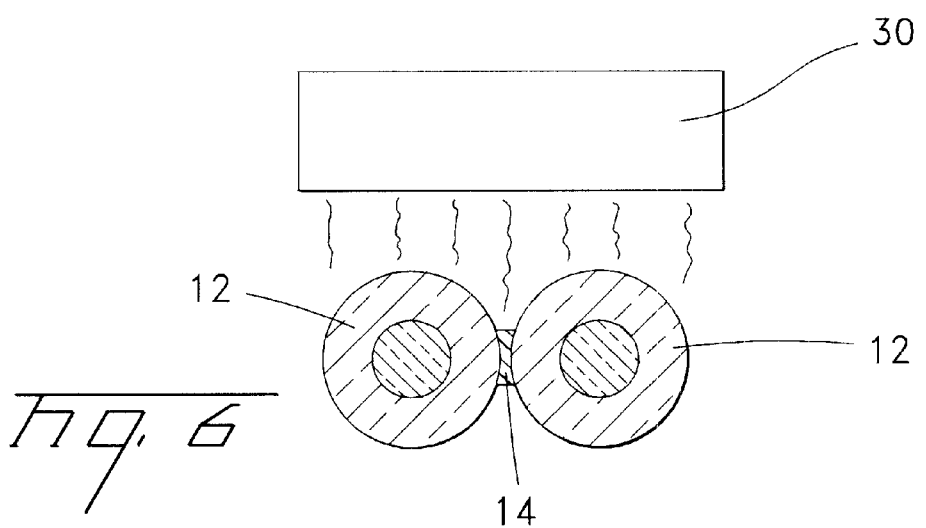

FIBER OPTIC ASSEMBLY AND METHOD OF MAKING SAME

FIELD OF THE INVENTION

The present invention relates to optical fibers such as are used in fiber optic cables for communication purposes. The invention relates more particularly to a fiber optic assembly for holding two or more parallel optical fibers in desired positions with respect to one another to, for example, facilitate splicing or connectorization of the fibers.

BACKGROUND OF THE INVENTION

Fiber optic cables have been developed containing two or more loose optical fibers within a buffer tube. The fibers within the buffer tube are free to move in various directions relative to each other, including longitudinally along the lengthwise directions of the fibers. Connection of the optical fibers of the cable to an optical device is accomplished with the aid of a connector designed to receive ends of the fibers. One type of connector is designed to have the fiber ends inserted into a rear end of the connector and pushed through channels defined in the connector until the end faces of the fibers protrude out an end face of the connector at a front end thereof. The fibers are then epoxied in place and cleaved at their ends protruding out from the connector end face, and finally the connector end face and fiber end faces are polished. With this type of connector, the ability of the optical fibers within the buffer tube to slide relative to each other assists, or at least does not hinder, the assembly of the connector on the ends of the fibers.

Another type of connector contains pre-polished optical fiber stubs having rear ends located internally within the connector for abutting with the ends of the cable fibers. The opposite front ends of the stubs are located proximate the front end face of the connector for mating with another-optical device. The connector is attached to the cable fiber ends by inserting the fiber ends into the rear end of the connector and sliding the fibers forward until their ends abut the rear ends of the stubs, and then the fibers are clamped into place by operating a cam member of the connector. In practice, before the fiber ends are inserted into the connector they are first prepared by laying them side-side on a mechanical cleaver and cleaving them to precisely the same length. After cleaving, however, it is possible for the fibers in the buffer tube to slide relative to each other, such as when handling the fibers and inserting the fibers into the connector. This movement between the fibers makes it difficult to place each fiber into proper abutting contact with the corresponding stub of the connector.

SUMMARY OF THE INVENTION

The present invention seeks to overcome the problems noted above by providing an optical fiber assembly in which two or more optical fibers are tacked to each other to prevent relative sliding therebetween, while allowing the fibers to be easily detached when desired. In accordance with a first aspect of the invention, the optical fiber assembly comprises a plurality of optical fibers arranged parallel to one another such that each optical fiber is closely adjacent to at least one other optical fiber, and a web of material disposed between each pair of adjacent optical fibers and bound to said fibers at opposing surfaces thereof, the web lightly tacking the adjacent fibers together to prevent relative sliding between the fibers along a longitudinal direction thereof and being readily broken when pulling forces are exerted on the fibers away from each other transverse to the longitudinal direction such that the fibers can be separated without the fibers being broken by the pulling forces. Preferably, after the fibers are tacked together they are enveloped in a buffer tube that serves to protect the fibers. The assembly can then be incorporated into a fiber optic cable.

The web binding the fibers together can be provided in various ways. In one embodiment of the invention, the optical fiber assembly is formed by placing a plurality of optical fibers side-by-side and parallel to one another such that adjacent fibers are closely spaced apart, applying a hardenable composition in a fluid state onto the fibers such that the composition fills a space between each pair of adjacent fibers, removing the composition from surfaces of the fibers other than opposing surfaces of adjacent fibers such that all surfaces of the fibers except for said opposing surfaces are substantially free of the composition, and causing the composition to harden, whereby webs of the hardened composition are attached between said opposing surfaces of adjacent fibers so as to bind the fibers together.

The fluid composition can be of various types, including but not limited to heat-curable and radiation-curable (e.g., UV-curable) compositions, and can be applied to the fibers by passing the fibers through a bath of the composition. The side-by-side fibers can then be passed through an aperture of a tool such that edges of the aperture scrape the composition off the surfaces of the fibers except for the opposing surfaces between which it is desired to form a web. The remaining composition between the fibers can then be hardened, such as by heating in the case of a heat-curable composition, or by exposing the composition to radiant energy in the case of a radiation-curable composition.

In accordance with another embodiment of the invention, the optical fiber assembly is made by coating each of a plurality of optical fibers with a hardenable composition in fluid form, placing the coated optical fibers side-by-side and parallel to one another, pressing adjacent fibers against each other while the composition is still fluid such that the coatings on the fibers meld together to form a web of the composition between the fibers, and causing the composition to harden such that adjacent fibers are bound together by the web of the composition. In this embodiment, the hardenable composition can comprise a coloring composition that is applied to impart a particular color to the fibers for identification purposes. Thus, the coloring composition can serve both coloring and binding purposes. The composition can be of various types, including but not limited to a solvent-based composition that hardens upon evaporation of the solvent, a heat-curable composition, or a radiation-curable composition.

In yet another embodiment of the invention, the fibers are provided to have a solid coating of a composition that is soluble in a solvent. For example, the coating can be a soluble ink for coloring the fibers. A quantity of the solvent for the coating composition is applied to at least a portion of the solid coating of each of the fibers so as to cause the composition to become softened and tacky. The fibers are then pressed together such that the tacky parts of the coatings of adjacent fibers meld together, and the solvent is allowed or caused to evaporate so that the composition becomes solid again, thus binding the fibers together.

The fiber optic assembly in accordance with the invention can have the web between fibers formed as a plurality of discrete web sections that are spaced apart in the lengthwise direction of the fibers, i.e., an intermittent web. The web, whether continuous or intermittent, is strong enough to prevent sliding of one fiber relative to the other, but is weak enough to allow the fibers to be pulled apart with relatively little force such that the optical fibers are not broken. Once pulled apart, the fibers are substantially free of any binding material that would have to be removed prior to cleaving and inserting the fibers into a connector. Thus, the optical fiber assembly of the invention is different from a conventional optical fiber ribbon in which the fibers are totally enveloped in a matrix of material having a relatively high modulus and hardness, such that the matrix material must be peeled off the fibers before the fibers can be separated from one another.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 3 is a cross-sectional view of a pair of optical fibers having had a coating of a composition applied to them in accordance with one preferred method of the present invention;

FIG. 4 is a schematic front elevation of a tool used for removing portions of the coating composition in accordance with the present invention;

FIG. 5 is a schematic view of the optical fibers being processed by the tool of FIG. 4; and FIG. 6 is a schematic view illustrating curing of the composition by heating and/or exposure to radiant energy.

DETAILED DESCRIPTION OF THE INVENTION

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
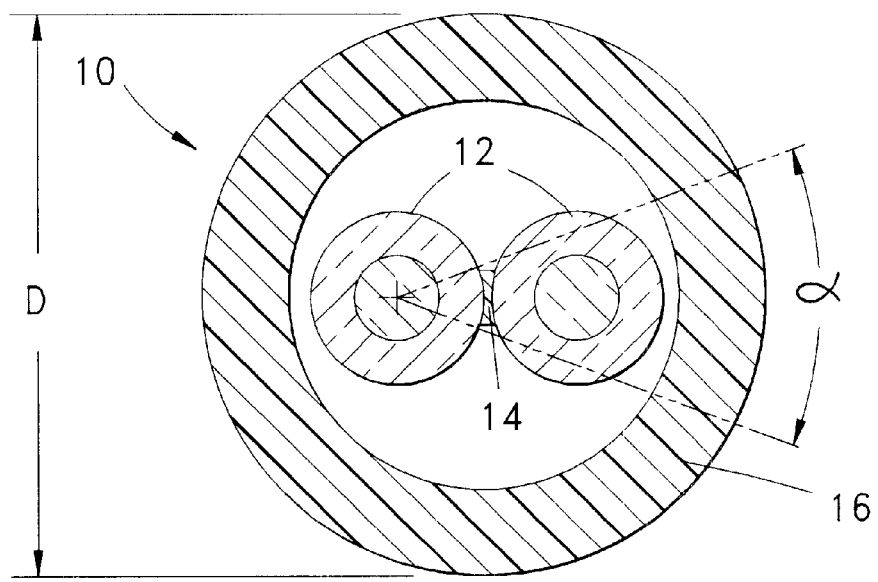
FIG. 1 is a cross-sectional view of an optical fiber assembly in accordance with the present invention.

FIG. 1 depicts a cross-sectional view of an optical fiber assembly 10 in accordance with one preferred embodiment of the invention. Assembly 10 includes a pair of optical fibers 12 lightly tacked or bound together by a longitudinally continuous or intermittent colored or non-colored web 14 that is distinct from the outer layer of the optical fibers. Fibers 12 are contained within a buffer tube 16 that serves to protect the fibers. The outside diameter (OD) of tube 16 is 800 to 2,000 µm, more preferably about 1,150 µm with an ID of about 580 µm. Tube 16 can include a water swellable yarn or a filling compound.

A typical optical fiber 12 includes a silica-based core that is operative to transmit light and is surrounded by a silica-based cladding having a lower index of refraction than the core. A soft primary coating surrounds the cladding, and a relatively rigid secondary coating surrounds the primary coating and preferably at least one fiber includes a coloring ink layer as an outermost layer; however, both or neither of the fibers could be colored. The OD of a colored fiber is preferably about 255 µm. The height of the web is about 100 to 125 µm, the width is about 50 µm or less, and the web subtends an angle α of about 120° or less, preferably about 60° or less (FIG. 1). Web 14 can comprise a meniscus shape. Optical fibers 12 can be, for example, single-mode or multi-mode optical fibers made commercially available by Corning Incorporated.

Web 14 can be formed of various materials. As one example, a thin thread of a curable resin, such as a UV-curable acrylic resin, can be laid between fibers 12 and then cured such that it bonds to the fibers. Other materials can alternatively be used for making web 14, including various types of initially fluid polymers that are solvent-based and solidify upon evaporation of the solvent, polymers that are curable by heating, or polymers that are curable by exposure to radiant energy such as UV radiation. In one embodiment, web 14 can comprise a small filament coated or impregnated with a resin material. The filament can be a fiber or tension element, for example, an aramid or Zylon material from Toyobo Co. LTD.

More particular descriptions of several suitable methods for binding fibers 12 together are presented below. Regardless of the material and method used, however, web 14 must be sufficiently strong to prevent relative sliding motion between fibers 12, yet be weak enough to permit fibers 12 to be easily separated from each other by pulling fibers 12 apart generally along the directions indicated by arrows 18 in FIG. 2, without causing fibers 12 to be broken. This separation of fibers 12 can be effected by causing a bond between web 14 and a fiber 12 to break, and/or by causing web 14 to break. A preferred fiber-to-fiber spacing is about 245±10 µm to about 300 µm±10 µm whether natural (uncolored) or colored fibers are used. In an alternative embodiment, the outer layers of the fibers may be upcoated to an OD of about 300 to 1000 µm or more, more preferably about 650 to 800 µm, therefore the fiber-to-fiber spacing may be up to about 1,000 µm or more.

Figure 2:
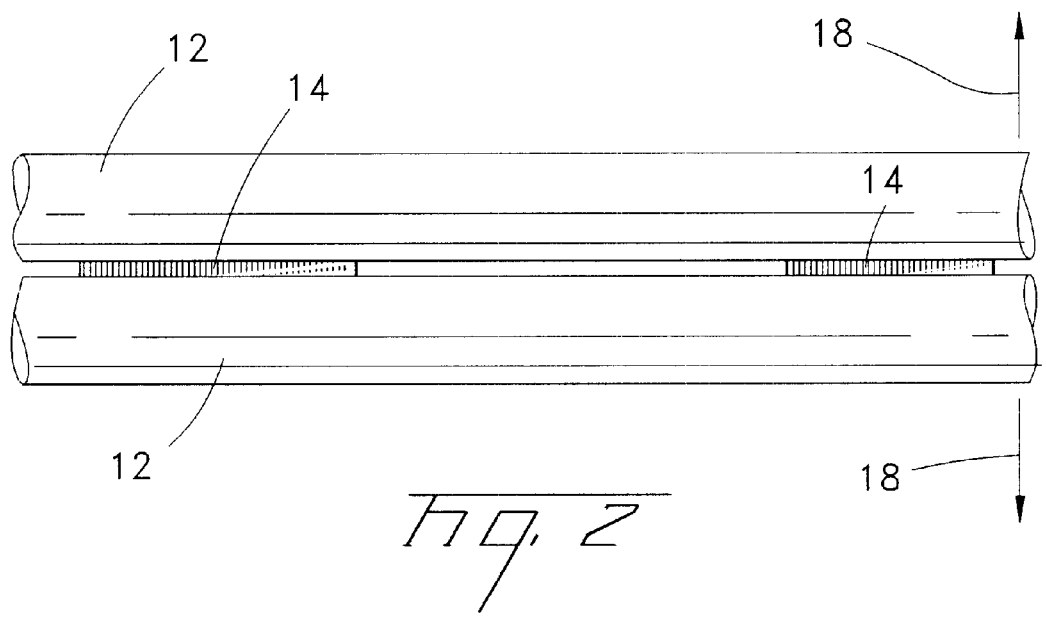
FIG. 2 is a top view of an optical fiber assembly according to the present invention.

The web 14 can be a continuous web that extends the entire lengths of fibers 12 substantially without interruption. Alternatively, as shown in FIG. 2, web 14 can be in the form of a plurality of discrete web sections 14 that are spaced apart along the fibers. This can result in a savings of material making up web 14 and/or can be used for tailoring the breaking strength of the connections between fibers 12. For example, where the web sections are relatively short in the longitudinal direction of the fibers, making a web section shorter will generally result in less force needed for breaking the web section or its bond with a fiber.

The amount of force required to break web 14 or its bond with a fiber 12 will generally depend on the cross-sectional area of the portion of web 14 that is subjected to the highest stress when fibers 12 are pulled apart. Adhesion strength is a minimum of about 2 grams/inch as measured by a film test. This cross-sectional area is a function of the thickness of web 14, and can also be a function of the longitudinal length of the web when it comprises a discrete web section that is relatively short in the longitudinal direction. That is, if the longitudinal length of web 14 is short enough that substantially the entire length of the web is subjected to essentially the peak stress tending to break the web or its connection with a fiber, the longitudinal length of the web can have an influence on the amount of force needed to break the connection. Web 14 can include a benzophenone material for initial UV and/or thermal cure, where curing is done with UV and thermal energy simultaneously or in series. In a preferred embodiment, ink layers preferably are made without substantial portions of silicone compound for good adhesion between web 14 and the ink layer. Preferably, the elongation to break is about 70% to about 200%. The preferred modulus ranges are between about a secant modulus of 25 to 400 MPa at 2.5% strain, more preferably a modulus of about 50 to 300 MPa, and most preferably about 60 MPa. A preferred glass transition temperature, based on the tan delta method is about −30 to +70 C,, more preferably about 20 C. When the fibers are separated, there may be either a cohesive or an adhesive failure mechanism. The failure mechanism may be determined by controlling the ratio of the material modulus and the strength of the bonding to the fiber.

A first preferred method for binding fibers together in accordance with the invention is now described with reference to FIGS. 3–6. In this embodiment, fibers 12 are arranged closely adjacent and parallel to each other, and a coating 20 of a fluid composition is applied to the fibers such that the fibers are coated on all sides and the fluid composition fills the space between the fibers as shown in cross-section in FIG. 3. The fluid composition is one that is initially fluid when applied but will solidify under appropriate conditions to form a solid material suitable for binding fibers 12 together. Various types of compositions can be used, including but not limited to solvent-based compositions (including polymer-based and other types) that solidify upon evaporation of the solvent from the composition, polymer-based compositions that are curable to become solid by heating the composition, and polymer-based compositions that are curable to become solid by exposing the composition to radiant energy such as UV radiation. One way in which coating 20 can be applied is by providing a bath (not shown) of the fluid composition and passing fibers 12 through the bath.

Next, prior to curing the fluid composition to solidify it, it is preferred to remove coating 20 from the surfaces of fibers 12 except for the opposing surfaces of the adjacent fibers between which the fluid composition extends to fill the space between the fibers. Removal of coating 20 from all but the opposing surfaces is preferred because it is desirable that fibers 12 be substantially free of any coating when they are separated from each other, so that the fibers can be inserted into a connector without first having to be stripped of a coating.

In a preferred embodiment of the invention, removal of the coating from surfaces of the fibers is accomplished by passing the fibers through an aperture 22 of a tool 24, shown in plan view in FIG. 4. Aperture 22 is configured as a pair of holes, each of which is slightly larger in diameter than a fiber 12, connected by a narrowed waist portion 28. Of course, it will be understood that the invention is not limited to joining only two fibers, and any number of fibers can be connected to one another in the manner described herein. The aperture in tool 24 in each case is formed as a plurality of holes (corresponding to the number of fibers), adjacent ones of which are connected by a narrowed waist portion as shown in FIG. 4. Alternatively, to reduce the amount of material to be removed, the material of web 14 can be deposited on the fibers by means of one or more orifices and/or syringes.

Because aperture 22 is only slightly larger than fibers 12, the fibers will pass through the aperture but coating 20 will not. Thus, the edge 26 of aperture 22 effectively scrapes the coating off most of the surfaces of fibers 12. However, in the region of the waist portion 28 of aperture 22, the coating will not be removed from the fibers. FIG. 5 is a plan view of tool 24, seen from a downstream side of the tool with regard to the direction in which fibers 12 are moving through aperture 22. Fibers 12 emerge from aperture 22 substantially free of the coating but with a web 14 of the fluid composition connected between the fibers. Thus, the method in accordance with the present embodiment of the invention essentially comprises applying a hardenable composition in fluid form over the fibers and then removing the composition from surfaces of the fibers except for the opposing surfaces of the fibers between which it is desired to form a connecting web.

After fibers 12 emerge from the aperture in tool 24, the remaining fluid composition between the fibers is caused or allowed to cure to solidify it. Where the composition is a heat-curable or radiation-curable material, the fibers are passed adjacent to a device 30 for causing the composition to cure. Curing can be done by elliptical mirrors with D type bulbs. Device 30 may be a heater, such as a forced-air or radiant heater, in the case of a heat-curable composition. A heater may also be used for hastening the evaporation of a solvent from a solvent-based composition. In the case of a radiation-curable composition, device 30 is an emitter of the desired type of radiation, such as a UV light. Thus, the composition solidifies to form web 14 joining fibers 12 together.

Other methods can be used for binding fibers together in accordance with the invention. One such method is to bind the fibers together using a coating of a coloring compound that is applied to the fibers for imparting a desired color to the fibers. It is commonplace to apply such coloring compounds to fibers for identification purposes so that fibers of one color can be visually distinguished from other differently colored fibers within a cable. In accordance with one embodiment of the invention, the coloring compound is applied to each of the fibers and, while the compound is still fluid or tacky, the fibers are pressed together, causing the fluid or tacky coatings on the fibers to meld together so that the fibers resemble the condition shown in FIG. 3. The fibers are held together until the compound solidifies. As a result, the fibers are bound together.

In another embodiment, each fiber is provided with a coating of a solid material that is soluble in a volatile solvent. For example, the coating may be a solvent-based ink that is applied to each fiber for imparting a desired color to each fiber. An example of such an ink is a solvent-based polyvinyl chloride (PVC) ink. When the ink is initially applied to a fiber it is fluid, but solidifies by evaporation of its solvent base to form the ink coating. In accordance with this embodiment of the invention, the ink is partially dissolved or softened by applying a quantity of the solvent to the coating to render the ink tacky. The tacky ink of one fiber is brought into contact with the tacky ink on another fiber and the fibers are held together until the solvent evaporates so that the ink again becomes solid. The resolidified portions of the ink coatings in contact with each other thus become bonded together. This method can be practiced, for example, by moving the fibers to be joined along closely adjacent generally parallel paths along which a solvent applicator is disposed between the fibers, bringing the fibers into contact with the applicator such that the fibers run over the applicator and solvent is applied to the fibers to render the coatings tacky, and then bringing the fibers into contact with each other downstream of the applicator. A heater and/or blower can be provided to hasten the evaporation of the solvent from the fibers.

Of course, the solid soluble coating need not be an ink for coloring the fibers, but could be a coating provided solely for binding the fibers together. Where fibers are to be colored, however, it is advantageous for the ink coating to serve both the coloring and binding purposes.

Regardless of the method used for forming the web binding fibers together, the web, whether continuous or intermittent, is strong enough to prevent sliding of one fiber relative to the other, but is weak enough to allow the fibers to be pulled apart with relatively little force such that the optical fibers are not broken. Once pulled apart, the fibers are substantially free of any binding material that would have to be removed prior to cleaving or other preparatory steps before inserting the fibers into a connector. Thus, the optical fiber assembly of the invention is different from a conventional optical fiber ribbon in which the fibers are totally enveloped in a matrix of material having a relatively high modulus and hardness, such that the matrix material must be peeled off the fibers before the fibers can be separated from one another. The invention thus enables time to be saved when preparing fibers for insertion into a connector, since stripping of matrix material is unnecessary. The invention also enables the fibers to be held in fixed longitudinal positions relative to one another after end portions of the fibers have been separated from one another. Because the fiber ends thus do not slide relative to each other, the fibers can be cleaved to the same length and the fibers are inhibited from thereafter shifting their longitudinal positions relative to one another yet transverse motion is allowed. The invention thereby facilitates the assembly of connectors having stub fibers onto the ends of the fibers. Yet another feature of the invention is that, unlike optical ribbons that do not permit bending in the plane of the ribbon, fibers joined in accordance with the invention can bend in the plane of the fiber assembly over a localized lengthwise part of the assembly by allowing the bonds between the fibers to break in the bent part so that the fibers are free to twist and move in various directions relative to one another. This feature can enhance optical performance of the fiber assembly.

Additionally, the intermittent web allows the fibers to flex in opposite transverse directions. This makes the fiber assembly bound with the intermittent web more flexible than conventional optical ribbons. Because the fiber bundles are manufactured with tension applied to the optical fibers at the time the web material is solidified and the tension is removed once the fibers are cabled, a residual differential strain may be imparted to the fibers if the tensions during manufacture are not exactly equal. The intermittent web allows the differential strains to be relaxed in the region between the webs preventing degraded optical performance of the fibers due to the residual strain. Conventional optical ribbons are difficult to separate and leave residue on the fibers after separation which can negatively affect connectorization.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An optical fiber assembly, comprising:
a plurality of optical fibers arranged generally parallel to one another such that each optical fiber is closely adjacent to at least one other optical fiber, each of said optical fibers comprising a silica based core and an outer coating layer;
a plurality of webs, distinct from said outer coating layers, being intermittently disposed between said optical fibers and bound to said outer coating layers, the plurality of webs lightly tacking the adjacent fibers together to prevent relative sliding between the fibers along a longitudinal direction thereof and being readily broken when pulling forces are exerted on the fibers away from each other transverse to the longitudinal direction such that the fibers can be separated without the fibers being broken by the pulling forces.

2. The interconnect cable of claim 1, said optical fibers being surrounded by a tube having an OD of about 800 to 2,000 $\mu$m.

3. The interconnect cable of claim 1, an outer layer of at least one of said optical fibers being a coloring layer with an OD of about 255 $\mu$m.

4. The interconnect cable of claim 1, one of said plurality of webs having a height of about 100 to 125 $\mu$m.

5. The interconnect cable of claim 1, one of said plurality of webs having a width of about 50 $\mu$m or less.

6. The interconnect cable of claim 1, one of said plurality of webs subtends an angle $\alpha$ of about 120° with respect to a center of one of said fibers.

7. The interconnect cable of claim 1, one of said plurality of webs comprises a small filament coated or impregnated with a resin material, said filament comprising a fiber or tension element.

8. The interconnect cable of claim 1, a fiber-to-fiber spacing being about 245±10 $\mu$m to about 300 $\mu$m±10 $\mu$m.

9. The interconnect cable of claim 1, the outer layers of the fibers being upcoated to an OD of about 300 to 1000 $\mu$m or more.

10. The interconnect cable of claim 1, the adhesion strength of one of said plurality of webs being a minimum of about 2 grams/inch.

11. The interconnect cable of claim 1, one of said plurality of webs being formed of a material having a glass transition temperature of about −30 to +70° C.

12. The interconnect cable of claim 1, one of said plurality of webs having a modulus range of about 25 to 400 MPa.

13. An optical fiber assembly, comprising:
a plurality of optical fibers arranged generally parallel to one another such that each optical fiber is closely adjacent to at least one other optical fiber, each of said optical fibers comprising a silica based core and an outer coating layer, the outer coating layers being intermittently connected, thereby tacking the adjacent fibers together to prevent relative sliding between the fibers along a longitudinal direction thereof and being readily broken when pulling forces are exerted on the fibers away from each other transverse to the longitudinal direction such that the fibers can be separated without the fibers being broken by the pulling forces.

14. An optical fiber assembly, comprising:
a first optical fiber, the first optical fiber having an ink layer;
a second optical fiber, the second optical fiber having an ink layer;
a web, the web being distinct from the optical fibers and contacting the respective ink layers of the first and second optical fibers thereby connecting the first and second optical fibers together without encapsulating the first and second optical fibers, wherein the web subtends and angle of about 60° and has a width of about 50 μm between a center of the first optical fiber and a center of the second optical fiber.

15. An optical fiber assembly, comprising:
a plurality of optical fibers arranged parallel to one another such that each optical fiber is closely adjacent to at least one other optical fiber, and a plurality of webs disposed between each pair of adjacent optical fibers and bound to said fibers at opposing surfaces thereof, the plurality of webs lightly tacking the adjacent fibers together to prevent relative sliding between the fibers along a longitudinal direction thereof and being readily broken when pulling forces are exerted on the fibers away from each other transverse to the longitudinal direction such that the fibers can be separated without the fibers being broken by the pulling forces.

16. The optical fiber assembly of claim 15, wherein there are only two of the optical fibers.

17. The optical fiber assembly of claim 16, further comprising a protective buffer tube surrounding the two optical fibers.

18. The optical fiber assembly of claim 15, wherein each of the optical fibers includes a coating of a compound that is fluid when initially applied to the fibers and is subsequently solidified, and wherein the plurality of webs between each pair of adjacent fibers is formed by pressing the coated fibers together while the compound is still fluid such that the coatings on the fibers become bound together when the compound solidifies.

19. The optical fiber assembly of claim 18, wherein the compound comprises a coloring compound.

20. The optical fiber assembly of claim 15, further comprising a buffer tube surrounding the optical fibers.

21. The optical fiber assembly of claim 15, wherein one of the plurality of webs between adjacent fibers comprises a thread of polymer material laid between the fibers and then hardened so as to bind to the fibers.

22. The optical fiber assembly of claim 15, wherein one of the plurality of webs comprises a heat-curable resin.

23. The optical fiber assembly of claim 15, wherein one of the plurality of webs comprises a radiation-curable resin.

24. The optical fiber assembly of claim 15, wherein all surfaces of the fibers are substantially free of the material of the plurality of webs except for said opposing surfaces of adjacent fibers at which the plurality of webs are bound.

25. The optical fiber assembly of claim 15, wherein the web comprises a plurality of discrete web sections spaced apart in the longitudinal direction along the fibers.

26. A method for making a fiber optic assembly, comprising:
placing a plurality of optical fibers side-by-side and parallel to one another such that adjacent fibers are closely spaced apart;

applying a hardenable composition in a fluid state onto the fibers such that the composition fills a space between each pair of adjacent fibers;

scraping the composition from surfaces of the fibers other than opposing surfaces of adjacent fibers such that all surfaces of the fibers except for said opposing surfaces are substantially free of the composition; and causing the composition to harden, whereby webs of the hardened composition are attached between said opposing surfaces of adjacent fibers so as to bind the fiber together.

27. The method of claim 26, wherein the applying step comprises passing the fibers through a bath of the composition.

28. The method of claim 26, further comprising extruding a buffer tube around the fibers.

29. The method of claim 26, wherein after the composition is applied the fibers are moved along a longitudinal direction of the fibers through an aperture of a tool, the composition on the fibers being contacted by edges of the aperture such that the edges remove the composition from the surfaces as the fibers pass through the aperture.

30. The method of claim 26, wherein the composition is hardened by exposing the composition to radiant energy.

31. The method of claim 26, wherein the composition is hardened by exposing the composition to radiant energy.

32. A method for making a fiber optic assembly, comprising:
providing a plurality of optical fibers each having a solid coating of a composition that is soluble in a volatile solvent;

applying a quantity of said solvent to at least a portion of an outer surface of the coating of each fiber so as to cause the portion of the coating to be rendered tacky, wherein the fibers are moved longitudinally and are brought into contact with an applicator that contacts the fibers and applies solvent thereto as the fibers pass over the applicator;

placing the fibers side-by-side and parallel to one another and pressing adjacent fibers against each other such that the tacky portions of the coatings stick to each other; and causing the solvent to evaporate such that the tacky composition again becomes solid, thereby binding adjacent fibers together by a web of the composition.

33. The method of claim 32, wherein the providing step comprises providing fibers having coatings of a soluble ink.

* * * * *